March 20, 1928.
W. R. HUME
1,662,923
VEHICLE FOR TRANSPORTING PIPES AND OTHER LOADS
Filed Nov. 18, 1925     2 Sheets-Sheet 2
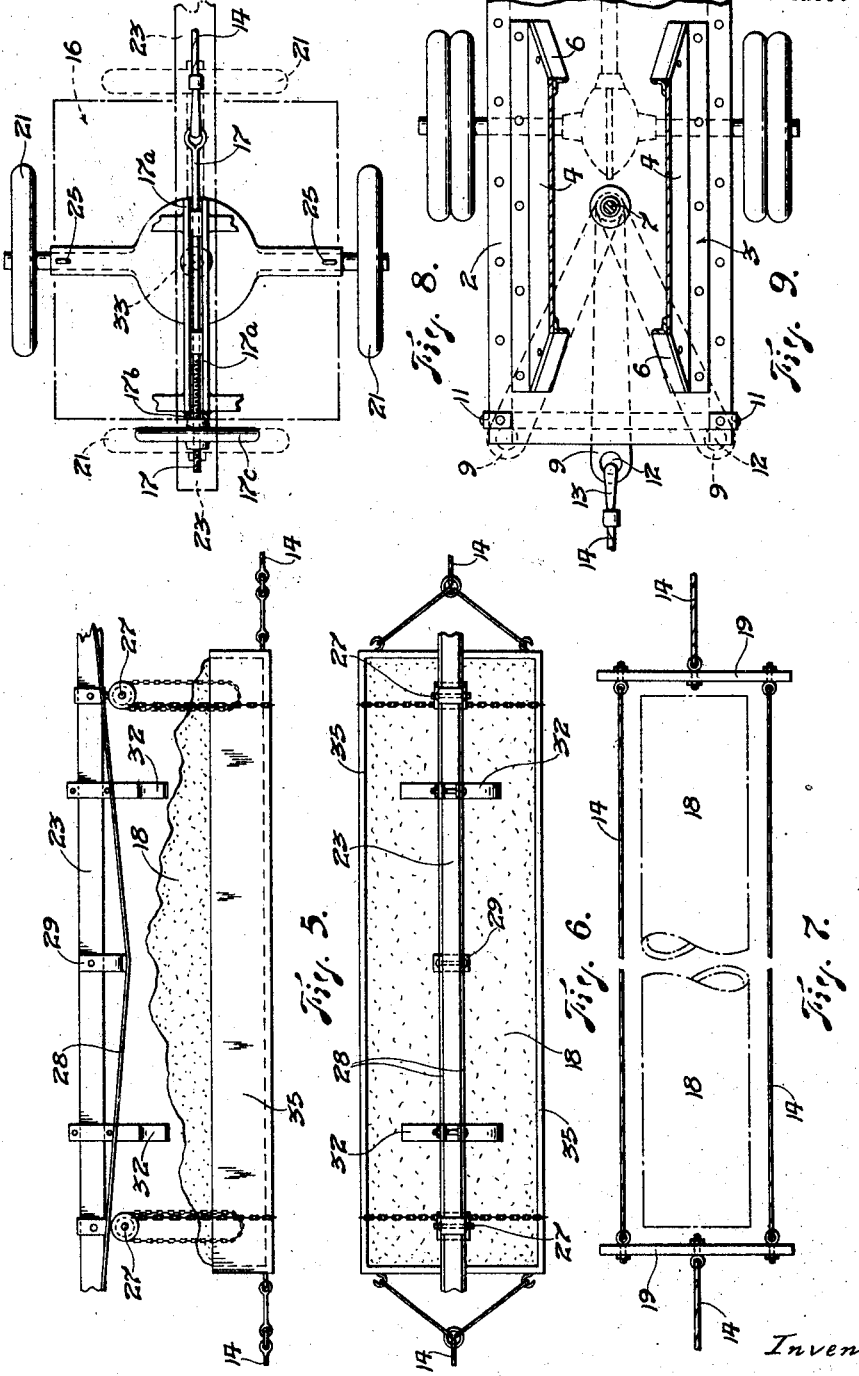
Inventor:
Walter Reginald Hume
By
Attorney.

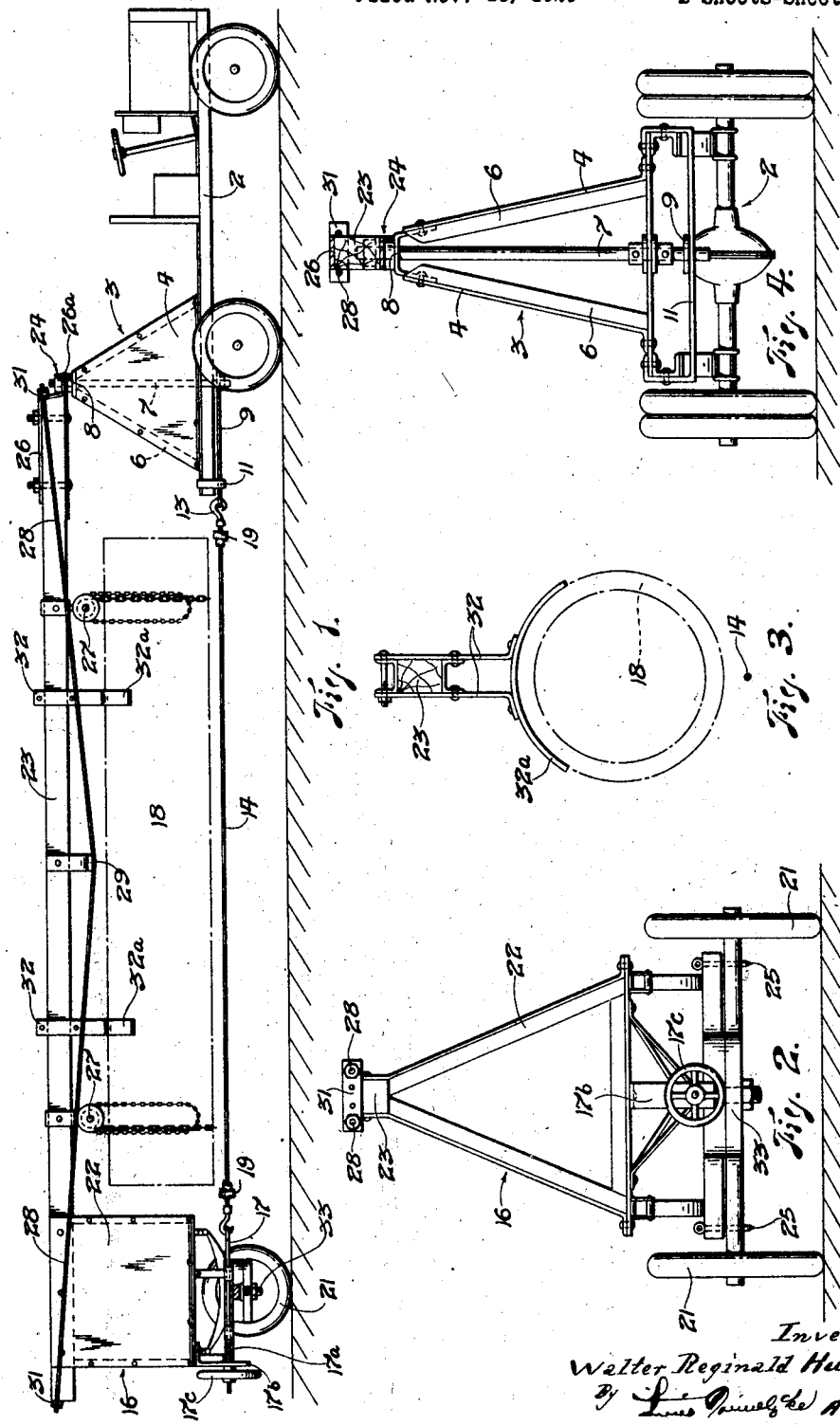

Patented Mar. 20, 1928.

1,662,923

UNITED STATES PATENT OFFICE.

WALTER REGINALD HUME, OF MELBOURNE, VICTORIA, AUSTRALIA.

VEHICLE FOR TRANSPORTING PIPES AND OTHER LOADS.

Application filed November 18, 1925, Serial No. 69,909, and in Australia December 3, 1924.

This invention relates to an improved vehicle for transporting pipes and other relatively heavy loads, and its object is to provide a vehicle and appurtenances thereof which will greatly facilitate the handling and transportation of such loads and will reduce to a minimum the time and manual labor entailed in such operations thereby materially reducing the costs of handling and transportation.

The invention has been designed, moreover, to materially increase the hauling capacity of existing motor vehicles or trucks, to overcome the existing difficulties in raising heavy loads onto and removing them from transport vehicles, and to enable cumbersome or awkward loads to be easily carried without a special vehicle body for the purpose. Furthermore the invention enables extremely heavy loads to be lifted onto and lowered from the vehicle by a single operator and enables interchangeable load carrying bodies or receptacles to be loaded ready for transport and unloaded during the absence of the improved vehicle to which such receptacles may be temporarily attached for transport from place to place.

Whilst the invention is more particularly applicable to use with a self-propelled forecarriage or tractive unit its characteristic features are also applicable to use with a forecarriage or tractive unit adapted to be drawn by animal power.

Referring to the drawings which form part of this specification:—

Figure 1 is a side elevation of a transport vehicle and its appurtenances in accordance with the invention.

Figure 2 is an enlarged rear view of the apparatus seen in Figure 1.

Figure 3 is a cross sectional detail view showing a strut extending between the load and the elevated beam from which the load is suspended.

Figure 4 is a cross sectional view looking at the rear of the fore-carriage or tractive unit.

Figure 5 is a detail view showing in side elevation a load carrying body or receptacle suspended from the elevated beam.

Figure 6 is a plan of the arrangement shown in Figure 5.

Figure 7 is a plan of a modification according to which tension lines are disposed at either side of the load and connected to equalizing bars or swingletrees which are in turn connected to the fore-carriage and the trailer respectively.

Figure 8 is a fragmentary plan showing in full lines the trailer wheels arranged for normal transit and in dotted lines said wheels disposed for side tracking.

Figure 9 is a fragmentary plan of the rear portion of the forecarriage or tractive unit seen in Figure 1.

The invention includes, as above mentioned, a forecarriage or tractive unit 2 which may be adapted for propulsion by motor or animal power, but which preferably consists of a suitably designed motor truck or trolley having at its rear an elevated or upstanding framework or supporting structure 3 of suitable height to carry the front end of an elevated beam or beams beneath and from which the load is suspended as hereinafter described. The said upstanding framework 3 preferably comprises a pair of oppositely disposed upwardly converging metal side plates 4, secured to upwardly converging frame members 6 of angle iron or the like the lower ends of which are secured to opposite sides of the forecarriage 2. This construction combines great strength with lightness and simplicity.

Associated with the said elevated framework or supporting structure of the forecarriage or tractive unit 2 is a vertical king pin 7, the upper end portion of which passes through a bracket or head piece 8 to which the upper ends of the frame members 6 are secured. The lower end of the king pin 7 preferably has attached thereto the front end of a draw bar 9 which pivots on said king pin and may pass near its rear end, through a transverse guide member 11 on the forecarriage 2 whereby the draw bar 9 is permitted to pivot or swing in a horizontal plane about the king pin 7.

The rear end of the said draw bar may be provided with a suitable connection, such as a ring or eye 12, to detachably receive a hook or the like 13 on the front end of a wire rope or other suitable tension line or cable 14, the rear end of which is connected to a wheeled trailer 16 located at some distance to the rear of the forecarriage. A tension spring or springs may, if desired, be inserted in the said tension line which is preferably coupled to the forward end of a hand operated tension screw 17 mounted on the trailer and adapted for manually adjusting the strain on the tension line. The adjusting screw 17 may be mounted to move longitudinally in a guideway 17ª on the undercarriage of the trailer and suitably held against turning movement, the rear portion of the screw passing through a depending bracket 17ᵇ and a screw threaded hand wheel 17ᶜ by which it is operated to tighten or slacken the tension line or lines 14. The object of this tensioning device is to exert a direct pull between the chassis of the forecarriage or tractive unit and the wheeled trailer in opposition to the strain caused by the weight of the load on the elevated beam, hereinafter described, which tends to force the forecarriage and trailer in opposite directions or away from each other.

In cases where a single tension line cannot conveniently be employed owing to the liability of its fouling the load 18 which is suspended between the forecarriage and trailer, an equalizing bar or swingletree such as 19 may be connected to the aforesaid draw bar and a tension line 14 attached to each end of this bar so that the tension lines are located at each side of the load instead of in a central position.

The wheeled trailer 16 is provided with a suitable chassis mounted on supporting wheels 21 and carrying an upstanding or elevated framework or supporting structure 22 which preferably extends to substantially the same height as the elevated framework 3 on the forecarriage. Fixed to and supported by this elevated framework 22 of the trailer is the rear end of an elevated load supporting beam 23 the front end (or ends) of which is adapted for detachable connection as at 24 to the upper end of the aforesaid king pin 7 so that the trailer unit is adapted to swing laterally about the axis of the king pin and thus freely turn corners and otherwise follow in the track of the forecarriage. Where a single beam 23 is employed it may be located on the longitudinal centre line of the vehicle whilst if two or more beams are employed they may extend parallel with or converge towards each other, suitable provision being made for detachably connecting the forward ends of the beams to the king pin 7 as above mentioned. To this end a metal strap 26 may be secured by bolts or the like to the top and bottom of the beam at its front end, this strap being intermediately folded upon itself as at 26 to receive the king pin 7.

Mounted on the elevated beam 23 between the forecarriage 3 and trailer 16 are suitable hoisting devices 27 by which the load 18 may be raised and lowered and thus suspended from the beam for transport purposes and deposited on the ground when the destination is reached. These hoisting devices may consist of pulley blocks and tackle, differential pulleys, or the like whereby heavy loads may be raised and lowered by a single operator without undue exertion. In order to minimize shocks upon the elevated beam the hoisting devices may, if desired, be resiliently mounted thereon by means of suitably arranged springs.

To strengthen the load supporting beam 23 it may be trussed by means of one or more tension or tie rods 28 one of which may extend longitudinally at each side of the beam as shown. These tie rods may be intermediately bent beneath a strut 29 at or near the centre of the beam the ends of said rods passing through lugs 31 on the beam ends where they are engaged by units to thereby exert an upward pressure on the centre of the beam. To additionally reinforce the load supporting beam one or more vertical struts 32 may extend between the beam and the load being carried. These struts depend from the elevated beam between the forecarriage and the trailer, and, as the load is raised by the hoisting devices 27, it engages the lower end of the struts with the result that the latter exert an upward pressure on the intermediate portion of the beam, thus obviating any sag therein and automatically strengthening the beam by causing the load to function as a prop or support for the intermediate portion thereof due to the tension exerted on the hoisting devices. As seen in Figure 3 the lower ends of the struts 32 may be provided with transversely curved members 32ª to accommodate a load such as a concrete pipe or the like.

In order to facilitate the positioning of the wheeled trailer behind the load when the latter is to be hoisted and suspended from the elevated beam, the wheels 21 of the trailer are preferably attached to a turntable 33 so that they may turn in a horizontal plane relatively to the elevated frameworks 3 and 22 and the beam 23. Suitably arranged removable pins, bolts, or other fastening devices as at 25 may be employed to hold this turntable with the wheels of the trailer in any desired attitude relative to the load supporting beam. By this means it will be evident that the trailer may be wheeled sidewardly as indicated in dotted lines in Figure 8 when picking up or depositing the load, whilst, by reason of the pivotal and detachable connection of the trailer to the king pin on the forecarriage or tractive unit, the latter may be similarly turned and moved sidewardly or detached from the trailer and backed up towards the front of the load prior to the hoisting of the latter from the ground. Similarly the swivelling movement provided by the trailer turntable and the king pin enables the load to be moved sidewardly, or side tracked, for instance when moving the load in a confined area.

In use the forecarriage or traction unit may be backed up towards the front of the load and the trailer moved up behind the load whereupon the front end of the beam 23 may be connected to the king pin of the forecarriage by means of the detachable pivotal connection 24 provided at the front of the elevated beam for the purpose. The endless chains or like members of the hoisting devices 27 may now be passed under the ends of the load 18 and the latter thereupon hoisted to a sufficient height to clear obstructions on the ground. As the load is thus hoisted it may engage the lower ends of the struts 32 on the elevated beam thus pressing the latter upwardly and eliminating any sag in the beam which is effectively reinforced by the struts 32, the tie rods 28 and strut 29, and the tension line or lines 14 which may be coupled between the forecarriage and trailer and tightened up by the screw 17 and hand wheel 17$^c$ after the load has been hoisted into position for transport as shown, for example, in Figure 1. It will be evident, that the above mentioned tensioning devices enable a direct longitudinal strain to be exerted between the chassis or undercarriages of the tractive unit 2 and the trailer 16 thus counteracting the bending effect of the load on the elevated beam 23 and greatly strengthening the loaded structure.

The load is now ready for transport and when its destination is reached it may be readily lowered onto the ground with a minimum of manual labor by appropriate manipulation of the hoisting devices 27. Moreover owing to the pivotal relationship of the trailer and the load supporting beam to the forecarriage or tractive unit, and of the trailer wheels to said beam and its elevated supporting framework 22, the load may be readily moved sidewardly to any desired position for unloading.

It will be obvious that in lifting pipes, girders, and such like loads it is merely necessary to place the endless chains of the lifting tackle under the load or otherwise directly connect the hoisting devices thereto. In cases where the load is of a non-compact nature, such for instance as sand, gravel, bricks, blocks, or the like, load carrying bodies or receptacles as indicated for instance, at 35, may be employed in conjunction with the vehicle and its appurtenances above described. These load carrying receptacles may be suitably connected to or rested in the hoisting devices 27 and thereby raised and suspended from the elevated supporting beam for transport in the manner indicated. If desired, the tension line or lines 14 may be divided and connected to the front and rear ends of the load carrying receptacles 35 as indicated in Figures 5 and 6 so that the pull on said tension line is transmitted through the load and the weight of the latter tends to increase said pull and consequently relieve the bending strain on the elevated beam. It will be evident, moreover, that the interchangeable bodies or receptacles 35 may be loaded and unloaded of their contents in the absence of the transport vehicle, thus materially increasing the utility and convenience of the apparatus.

The invention provides a simple, inexpensive and highly efficient apparatus for the economical transportation of heavy loads, the invention being easily applied to existing motor trucks or tractive vehicles which may, with little expense, be suitably modified to provide the desired elevated pivotal support for the front end of the load supporting beam carried by the trailer which, with said beam, may be readily detached from the tractive unit or truck 2 if and when desired.

Having now described my invention what I claim as new and desire to secure by Letters Patent is:—

1. An improved vehicle especially for transporting pipes comprising in combination a wheeled forecarriage carrying an upstanding framework, an elevated load carrying beam supported at its forward end upon the top of said framework, a wheeled trailer having an upstanding framework disposed beneath and secured to the rear end of said beam, and hoisting devices associated with said beam whereby the load may be raised and lowered and suspended therefrom, said upstanding frameworks comprising side frames which are secured at their lower ends to the forecarriage and the trailer respectively and converge upwardly towards said elevated beam substantially as and for the purpose specified.

2. An improved vehicle especially for transporting pipes comprising in combination a wheeled forecarriage carrying an upstanding support, an elevated load carrying beam attached at its forward end upon the top of said support, a wheeled trailer having an upstanding support disposed beneath and secured to the rear end of said beam, hoisting devices associated with said beam whereby the load may be raised and lowered and suspended therefrom between said forecarriage and said trailer, and a tension line extending between the chassis of said forecarriage and said trailer beneath said elevated beam whereby a direct pull may be exerted between the forecarriage and trailer in opposition to the bending strain caused by the load suspended from said beam for the purpose specified.

3. An improved vehicle especially for transporting pipes comprising in combination a wheeled forecarriage, an elevated load carrying beam connected at its forward end to said forecarriage above the latter, a wheeled trailer disposed beneath and attached to the rear end of said beam, means for suspending the load from said beam between the forecarriage and the trailer, a tension line extending between said forecarriage and said trailer beneath said elevated beam and means for adjusting the tension on said tension line for the purpose specified.

4. An improved vehicle especially for transporting pipes comprising in combination a wheeled forecarriage carrying an upstanding support, an elevated load carrying beam attached at its forward end to said support, a wheeled trailer having an upstanding support disposed beneath and attached to the rear end of said beam, hoisting devices associated with said beam whereby the load may be raised and lowered and suspended therefrom between said forecarriage and said trailer, a tension line extending between the chassis of said forecarriage and said trailer beneath said elevated beam, and an adjusting screw connected to an end of said tension line whereby the tension on the latter may be adjusted for the purpose specified.

5. An improved vehicle especially for transporting pipes comprising in combination a tractive unit carrying an upstanding framework, an elevated load carrying beam pivotally connected at its forward end to said upstanding framework, a wheeled trailer having an upstanding framework disposed beneath and attached to the rear end of said beam, hoisting devices mounted on said beam between said tractive unit, a tension line extending between said tractive unit and said trailer beneath said elevated beam, and an adjusting screw and hand wheel mounted on the trailer and connected to the rear end of said tension line for the purpose specified.

6. An improved vehicle especially for transporting pipes comprising in combination a wheeled forecarriage, an elevated load carrying beam connected at its forward end to said forecarriage, a wheeled trailer disposed beneath and secured to the rear end of said beam, hoisting devices associated with said beam whereby the load may be raised and lowered and suspended from said beam, between the forecarriage and the trailer, a tension line extending between the chassis of said forecarriage and said trailer beneath said elevated beam, an adjusting screw and hand wheel mounted on the trailer and connected to the rear end of said tension line, and guide members carried by said trailer and adapted to guide said adjusting screw in its longitudinal movement for the purpose specified.

7. An improved vehicle especially for transporting pipes comprising in combination a wheeled forecarriage carrying in upstanding support, an elevated load carrying beam mounted at its forward end upon said support, a wheeled trailer having an upstanding support disposed beneath and secured to the rear end of said beam, hoisting devices associated with said beam whereby the load may be raised and lowered and suspended therefrom between the forecarriage and the trailer, a draw bar mounted on said forecarriage, and a tension line connected at its forward end to said drawbar and at its rear end to said trailer whereby a direct pull may be exerted between said forecarriage and said trailer in opposition to the bending strain caused by the load suspended from said beam for the purpose specified.

8. An improved vehicle especially for transporting pipes comprising in combination a tractive unit carrying an upstanding framework, and a king pin associated with said framework, an elevated load carrying beam supported at its forward end upon said framework, and pivoted to said king pin, a wheeled trailer having an upstanding framework disposed beneath and secured to the rear end of said beam, means for suspending the load from said beam between the unit and the trailer, a draw bar pivotally connected at its forward end to said king pin and adapted to swing laterally about said pivot, and a tension line connected at its forward end to said draw bar and extending between the unit and the trailer beneath said elevated beam whereby a direct pull may be exerted between said unit and trailer in opposition to the bending strain caused by the load suspended from said beam for the purpose specified.

9. An improved vehicle especially for transporting pipes comprising in combination a wheeled forecarriage carrying an upstanding support, an elevated load carrying beam attached at its forward end to said support, a wheeled trailer having an upstanding support disposed beneath and secured to the rear end of said beam, hoisting devices associated with said beam whereby the load may be raised and lowered and suspended therefrom between the forecarriage and the trailer, and means disposed between said forecarriage and trailer for bracing the intermediate portion of said elevated beam against bending strains caused by the suspension of the load therefrom for the purpose specified.

10. An improved vehicle especially for transporting pipes comprising in combination a wheeled forecarriage carrying an upstanding framework, an elevated load carrying beam supported at its forward end upon the top of said framework, a wheeled trailer having an upstanding framework disposed beneath and secured to the rear end of said beam, hoisting devices mounted on said beam whereby the load may be raised and lowered and suspended therefrom, beneath said forecarriage and said trailer, and a strut depending from said elevated beam and adapted to engage the load suspended therefrom for the purpose specified.

11. An improved vehicle especially for transporting pipes comprising in combination a wheeled forecarriage carrying an upstanding framework, an elevated load carrying beam supported at its forward end upon the top of said framework, a wheeled trailer having an upstanding framework disposed beneath and secured to the rear end of said beam, hoisting devices mounted on said beam between said forecarriage and said trailer whereby the load may be raised and lowered and suspended from said beam, and means for trussing said beam comprising a strut depending therefrom approximately near its centre, and tie rods extending from end to end of the beam and beneath said strut whereby said tie rods are adapted to exert an upward pressure on the central portion of the beam for the purpose specified.

12. An improved vehicle especially for transporting pipes comprising in combination a wheeled forecarriage carrying an upstanding framework, an elevated load carrying beam supported at its forward end upon said framework, a wheeled trailer having an upstanding framework disposed beneath and secured to the rear end of said beam, hoisting devices associated with said beam whereby the load may be raised and lowered and suspended therefrom between the forecarriage and the trailer, and means for trussing said beam comprising a strut depending from the beam and longitudinal tie rods co-operating with said strut, one of said tie rods being disposed at each side of the beam, lugs projecting sidewardly from the ends of the beam and nuts engaging threaded ends of said tie rods which pass through said lugs substantially as and for the purpose specified.

13. An improved vehicle especially for transporting pipes comprising in combination a wheeled forecarriage, an elevated load carrying beam connected at its forward end to said forecarriage above the latter, a wheeled trailer disposed beneath and attached to the rear end of said beam, means for suspending the load from said beam between the forecarriage and the trailer, tension lines extending between said forecarriage and said trailer beneath said beam and means for adjusting the tension on said tension lines for the purpose specified.

14. An improved vehicle especially for transporting pipes comprising in combination a wheeled forecarriage carrying an upstanding support, an elevated load carrying beam attached at its forward end to said support, a wheeled trailer having an upstanding support disposed beneath and attached to the rear end of said beam, hoisting devices associated with said beam whereby the load may be raised and lowered and suspended therefrom between said forecarriage and said trailer, tension lines extending between the chassis of said forecarriage and said trailer beneath said elevated beam, and an adjusting screw connected to an end of said tension lines whereby the tension on the latter may be adjusted for the purpose specified.

15. An improved vehicle especially for transporting pipes comprising in combination a tractive unit carrying an upstanding support, an elevated load carrying beam mounted at its forward end upon said support, a wheeled trailer having an upstanding support disposed beneath and attached to the rear portion of said beam, hoisting devices associated with said beam whereby the load may be raised and lowered and suspended therefrom between said forecarriage and trailer, a tension line extending between the chassis of said forecarriage and said trailer beneath the elevated beam, and transverse equalizing bars disposed between the forecarriage and the trailer, said equalizing bars being connected to the forecarriage and trailer by the end portions of said tension line and connected to each other by intermediate portions of said tension line such intermediate portions being disposed at either side of the load substantially as and for the purpose specified.

16. An improved vehicle especially for transporting pipes comprising in combination a forecarriage, an elevated load supporting beam detachably and pivotally connected at its forward end to said forecarriage, above the latter, a wheeled trailer disposed beneath and supporting the rear portion of said elevated beam, hoisting devices mounted on said beam between said forecarriage and said trailer whereby the load may be raised and lowered and suspended from said beam, means for bracing the central part of said beam against bending stresses caused by the suspension of the load therefrom, a tension line extending between said forecarriage and said trailer beneath said beam, and adjusting means associated with said tension line for the purpose specified.

17. An improved vehicle especially for transporting pipes comprising in combination a wheeled forecarriage carrying an upstanding support, an elevated load carrying beam connected at its forward end to the top of said support, a wheeled trailer having an upstanding support disposed beneath and secured to the rear end of said beam, and hoisting devices associated with said beam whereby the load may be raised and lowered and suspended therefrom between said forecarriage and said trailer, and a strut depending from said elevated beam and adapted to engage the load suspended therefrom, said strut being provided with transversely curved members at their lower ends substantially as and for the purpose specified.

18. An improved vehicle especially for transporting pipes comprising in combination a wheeled forecarriage carrying an upstanding support, an elevated load carrying beam mounted at its forward end on said support, a wheeled trailer having an upstanding support disposed beneath and attached to the rear end of said beam, hoisting devices associated with said beam whereby the load may be raised and lowered and suspended therefrom between said forecarriage and said trailer, and means for trussing said beam, comprising a longitudinal tie rod and a cooperating strut whereby said tie rod is adapted to exert an upward pressure on the central portion of the beam, for the purpose specified.

In testimony whereof I affix my signature.

WALTER REGINALD HUME.